US007054825B1

(12) United States Patent
Hirahara et al.

(10) Patent No.: US 7,054,825 B1
(45) Date of Patent: May 30, 2006

(54) VISITING PLAN GENERATION METHOD AND SYSTEM

(75) Inventors: Makoto Hirahara, Sagamihara (JP);
Takehiko Shida, Yokohama (JP);
Toshiki Kindo, Yokohama (JP);
Yasuhiro Maenishi, Kofu (JP)

(73) Assignee: Matsushita Electric Industrial Co. Ltd., Osaka (JP)

( * ) Notice: Subject to any disclaimer, the term of this patent is extended or adjusted under 35 U.S.C. 154(b) by 912 days.

(21) Appl. No.: 09/668,296

(22) Filed: Sep. 25, 2000

(30) Foreign Application Priority Data

Sep. 24, 1999 (JP) ................................. 11-271441

(51) Int. Cl.
*G06Q 10/00* (2006.01)

(52) U.S. Cl. .................................. 705/8; 705/7; 705/9
(58) Field of Classification Search .................... 705/8, 705/10, 9
See application file for complete search history.

(56) References Cited

U.S. PATENT DOCUMENTS

| | | | |
|---|---|---|---|
| 5,265,006 A | | 11/1993 | Asthana et al. |
| 5,615,121 A | * | 3/1997 | Babayev et al. ................ 705/9 |
| 5,724,243 A | * | 3/1998 | Westerlage et al. ....... 455/456.5 |
| 5,778,346 A | * | 7/1998 | Frid-Nielsen et al. .......... 705/9 |
| 5,848,395 A | * | 12/1998 | Edgar et al. .................... 705/9 |
| 5,913,201 A | | 6/1999 | Kocur |
| 5,933,810 A | * | 8/1999 | Okawa ........................... 705/5 |
| 5,943,652 A | * | 8/1999 | Sisley et al. .................... 705/9 |
| 5,948,040 A | * | 9/1999 | DeLorme et al. ........... 701/201 |
| 5,963,911 A | * | 10/1999 | Walker et al. ................. 705/7 |
| 5,987,377 A | * | 11/1999 | Westerlage et al. ......... 701/204 |
| 6,026,375 A | * | 2/2000 | Hall et al. ..................... 705/26 |
| 6,085,166 A | * | 7/2000 | Beckhardt et al. ............. 705/9 |
| 6,101,480 A | * | 8/2000 | Conmy et al. ................. 705/9 |
| 6,345,260 B1 | * | 2/2002 | Cummings et al. ............ 705/8 |
| 6,389,454 B1 | * | 5/2002 | Ralston et al. .............. 709/204 |
| 6,392,669 B1 | * | 5/2002 | Matoba et al. .............. 345/751 |
| 6,401,032 B1 | * | 6/2002 | Jamison et al. ............. 701/207 |
| 6,438,704 B1 | * | 8/2002 | Harris et al. ................ 713/502 |

FOREIGN PATENT DOCUMENTS

WO    WO 98/35311     * 8/1998

OTHER PUBLICATIONS

"Using Microsoft Project" Microsoft Press, 1994.*
Anantaram, C., et al., "Crew Rostering System; An Expert System for Scheduling Crew for Indian Airlines", Orlando, Mar. 1-5, 1993, Los Alamitos, IEEE Comp. Soc. Press, U.S. vol. CONF 9, Mar. 1, 1993, p.63-70 XP 010125574.

(Continued)

*Primary Examiner*—Tariq R. Hafiz
*Assistant Examiner*—Catherine M. Tarae
(74) *Attorney, Agent, or Firm*—Browdy and Neimark, PLLC (57) ABSTRACT

A visiting plan generation method and system for promptly carrying out optimum formation of groups, optimum destination assignment to the groups, and optimum planning for each of the groups in an optimization problem of an action plan. In implementation, at least information on plural groups which are to take visiting actions, information on members of each of the plural groups, and information on destinations are received by input means, and optimum formation of the plural groups and optimum destination assignment to each of the plural groups are performed by cost calculation means which provides a cost function for evaluating a visiting plan. Thus, in preparation of a visiting plan for a plurality of groups to visit a plurality of destinations on a task-sharing basis, it is possible to carry out optimum formation or the plural groups, optimum destination assignment to the plural groups, and optimum planning for each of the plural groups.

7 Claims, 11 Drawing Sheets

OTHER PUBLICATIONS

Onodera, K, "Cockpit Crew Scheduling and Supporting System Using AI Techniques", *NEC Research and Development*, Nippon Electric Ltd. Tokyo, Japan, No. 92, 1989, p. 151-156 XP 000120134.

* cited by examiner

| DESTINATION | LOCATION (X, Y) | KIND OF TASK |
|---|---|---|
| 1 | (34,93) | TASK C |
| 2 | (78,46) | TASK A |
| 3 | (13,5) | TASK A,B |
| 4 | (4,72) | TASK B |
| 5 | (52,12) | TASK B |
| 6 | (22,10) | TASK A |
| 7 | (46,33) | TASK B |
| 8 | (69,81) | TASK B |
| 9 | (9,85) | TASK C |
| 10 | (22,54) | TASK A |
| 11 | (29,47) | TASK C |

FIG.4

| MEMBER | MOBILE CAPABILITY (SPEED OF MOVEMENT) | WORKING CAPABILITY (TIME REQUIRED FOR TASK) | | |
|---|---|---|---|---|
| | | TASK A | TASK B | TASK C |
| 1 | 7 | 3 | 2 | 100 |
| 2 | 4 | 6 | 2 | 3 |
| 3 | 5 | 2 | 250 | 1 |
| 4 | 15 | 10 | 12 | 8 |
| 5 | 3 | 7 | 10 | 5 |
| 6 | 10 | 5 | 8 | 200 |
| 7 | 8 | 14 | 6 | 4 |

FIG.3

| GROUP | ATTRIBUTE | GROUP CONSTRAINTS ||||  INITIAL GROUP FORMATION |
|---|---|---|---|---|---|
| | | MAXIMUM NUMBER OF MEMBERS | ACCOMMO- DABLE MEMBERS | GROUP FORMATION | RELATIONSHIP OF MEMBERS IN GROUP | |
| 1 | VARIABLE | 1 | 1, 2, 5, 7 | — | — | 5 |
| 2 | INVARIABLE | — | — | 2, 6 | TWO MEMBERS ARE TO BE WITHIN A PREDETERMINED DISTANCE. | — |
| 3 | VARIABLE | 3 | ANY MEMBERS | — | THREE MEMBERS ARE TO BE ALIGNED EQUIDISTANTLY | 1, 4 |

FIG.5

| GROUP | GROUP FORMATION | VISITING PLAN : MEMBERS – DESTINATIONS (TASK) ||||
|---|---|---|---|---|---|
| | | 1 | 2 | 3 | 4 |
| 1 | 7 | 7-10(A) | 7-7(B) | | |
| 2 | 2, 6 | 2-3(A, B) | 6-6(A) | 6-8(B) | 2-11(C) |
| 3 | 1, 5 | 1-9(C) | 5-1(C) | 5-5(B) | |

FIG.6

| DESTINATION | 1 | 2 | 3 | 4 | 5 | 6 | 7 | 8 | 9 | 10 | 11 |
|---|---|---|---|---|---|---|---|---|---|---|---|
| GROUP NUMBER | 3 | UNASSIGNED | 2 | UNASSIGNED | 3 | 2 | 1 | 2 | 3 | 1 | 2 |

FIG.7

| MEMBER | 1 | 2 | 3 | 4 | 5 | 6 | 7 |
|---|---|---|---|---|---|---|---|
| GROUP NUMBER | 3 | 2 | UNASSIGNED | UNASSIGNED | 3 | 2 | 1 |

VISITING PLAN GENERATION METHOD AND SYSTEM

BACKGROUND OF THE INVENTION

1. Field of the Invention

The present invention relates to a method for generating a visiting plan and a system therefor. More particularly, the invention pertains to a visiting plan generating method and system wherein, for a plurality of groups having invariable and/or variable members (persons or apparatuses) to visit a plurality of destinations on a task-sharing basis, optimum formation of the plural groups, optimum destination assignment to the plural groups, and optimum planning for each of the plural groups can be carried out.

2. Description of the Related Art

As a typical example of a problem concerning generation of an optimum visiting plan, there is a classic mathematical problem called the Traveling Salesman Problem, in which an order of visiting a plurality of cities through a minimum total path is to be determined on the assumption that a visit must be made to each of the plural cities only once. That is to say, in the Traveling Salesman Problem, a travel distance uniquely determined according to an order of visiting cities is used as a cost function to seek an optimum solution. For example, an approximate solution to the Traveling Salesman Problem has been proposed by Hopfield, J. J. and Tank, D. W. (Hopfield, J. J. & Tank, D. W., (1985) "Neural" Computation of Decisions in Optimization Problems, Biological Cybernetics, 52, pp. 141–152) using the Hopfield model (Hopfield, J. J., (1984) Neurons with graded response have collective computational properties like those of two-state neurons; Proceedings of the National Academy of Sciences, USA, 81, pp. 3088–3092).

In the Traveling Salesman Problem handled in conventional solution methods, however, optimization has been attempted on the premise that a single salesman is to visit all the cities of interest.

In a situation where one salesman cannot cover all the cities of interest, it is required to make assignment to a plurality of salesmen. An optimum solution method in such a case has not been devised heretofore, however.

SUMMARY OF THE INVENTION

In view of the foregoing, it is an object of the present invention to provide a visiting plan generation method and system for promptly carrying out optimum formation of groups, optimum destination assignment to the groups, and optimum planning for each of the groups in an optimization problem concerning a visiting plan.

It is another abject of the present invention to provide a visiting plan generation method and system for making an optimum solution for a visiting plan applicable to generation of such action plans as a transportation plan, process plan, and operation plan.

In accomplishing these objects of the present invention, there is provided a technique in which a visiting plan is generated for a plurality of groups instead of generation of a visiting plan for an individual as in the conventional solution methods for the Traveling Salesman Problem. According to one aspect of the present invention, at least information on a plurality of groups, information on members of each of the plural groups, and information on destinations are input, optimum formation of the plural groups and optimum destination assignment to each of the plural groups are made using a cost function for evaluating a visiting plan. Thus, in preparation of a visiting plan for a plurality of groups to visit a plurality of destinations on a task-sharing basis, it is possible to carry out optimum formation of the plural groups, optimum destination assignment to the plural groups, and optimum planning for each of the plural groups.

Further, in accordance with another aspect of the present invention, using the cost function, a maximum cost value in a plurality of groups is minimized, an average cost value in the plural groups is minimized, or cost values in the plural groups are equalized. Thus, it is possible to generate a visiting plan so that visiting actions can be taken at low cost from a viewpoint of the whole of the groups or without variation in cost among the groups.

Still further, if an unassigned destination is found during generation processing operation of a visiting plan, new assignment of the unassigned destination and re-formation of the visiting plan are performed. As required, re-assignment of already assigned destinations and/or re-arrangement of groups, and visiting plan re-formation therewith can be performed. It is also possible to make re-arrangement of variable-member groups as required. When the unassigned destination is added for group re-arrangement, optimum formation of the groups, optimum destination assignment to the groups, and optimum planning for each of the groups can be carried out according to the result of cost calculation. In this manner, according to the visiting plan generation method of the present inventions for a plurality of groups having invariable and/or variable members (persons or apparatuses) to visit a plurality of destinations on a task-sharing basis, it is possible to promptly accomplish optimum formation of variable-member groups, optimum destination assignment to the groups, and optimum planning for each of the groups. The present invention can therefore provide an effective method applicable to generation of such action plans as a transportation plan, process plan, and operation plan.

In accordance with another aspect of the present invention, for generating a visiting plan in which a plurality of groups are to visit a plurality of destinations on a task-sharing basis, at least information on the plural groups, information on members of the plural groups, and information on the destinations are input, and optimum formation of the plural groups and optimum destination assignment to each of the plural groups are made using a cost function for evaluating the visiting plan. Thus, the present invention makes it possible to carry out optimum formation of the groups, optimum destination assignment to the groups, and optimum planning for each of the groups.

Furthermore, at least one of processing operations including minimization processing for minimizing a maximum cost value in a plurality of groups, minimization processing for minimizing an average cost value in the plural groups, and equalization processing for equalizing cost values in the plural groups is carried out using a cost function. Thus, optimum formation of the groups, optimum destination assignment to the groups, and optimum planning for each or the groups can be accomplished at low cost from a viewpoint of the whole of the groups. It is also possible to accomplish optimum formation of the groups, optimum destination assignment to the groups, and optimum planning for each of the groups without variation in cost according to the result of cost calculation.

Still further, in accordance with another aspect of the present invention, if there is an unassigned destination, new assignment of the unassigned destination and visiting plan re-formation therewith are performed. As required, re-assignment of already assigned destinations and visiting plan re-formation therewith can be performed. Thus, any unassigned destination can be added, and even with addition of the unassigned destination, optimum formation of the groups, optimum destination assignment to the groups, and optimum planning for each of the groups can be carried out according to the result of cost calculation.

Still further, in accordance with another aspect of the present invention, there is provided a visiting plan generation method wherein, for a plurality of groups having invariable and/or variable members to visit a plurality of destination on a task-sharing basis, optimum formation of variable-member groups, optimum destination assignment to the plural groups, and optimum planning for each of the plural groups are accomplished. In the visiting plan generation method, at least information on the plural destinations, information an the plural groups, and information on the plural members are input, and new assignment of an unassigned destination and visiting plan re-formation therewith are performed using a cost function for visiting plan evaluation. As required, re-assignment of already assigned destinations and/or rearrangement of the variable-member groups and visiting plan re-formation therewith are performed. Further, at least one of processing operations including minimization processing for minimizing a maximum cost value in the plural groups, minimization processing for minimizing an average cost value in the plural groups, and equalization processing for equalizing cost values in the plural groups is carried out. Thus, optimum formation of the groups, optimum destination assignment to the groups, and optimum planning for each of the groups can be accomplished.

Still further, in accordance with another aspect of the present invention, there is provided a visiting plan generation method in which the information on destinations contains locations of the destinations, and as required, the information of the destinations also contains conditions of tasks to be performed at the destinations. Thus, according to the locations of the destinations and the conditions of the tasks to be performed at the destinations, it is possible to make optimum formation of the groups, optimum destination assignment to the groups, and optimum planning for each of the groups.

Still further, in accordance with another aspect of the present invention, in case that information on any group contains attributes of the group (invariable or variable attribute values) and group constraints for constraining members belonging to the group and that the group is a variable-member group, initial group formation data is also indicated. Thus, according to characteristics of respective groups, it is possible to carry out optimum formation of the groups, optimum destination assignment to the groups, and optimum planning for each of the groups.

Still further, in case that the attribute values of any group are variable, initial group formation data is also indicated. Thus, with an initial group formation taken into account as a group characteristic, optimum formation of the groups, optimum destination assignment to the groups, and optimum planning for each of the groups can be carried out.

Still further, in accordance with another aspect of the present invention, in case that constrains for any group include a relationship among members belonging to the group and that the group is an invariable-member group, data of group formation is also indicated. In case that the group is a variable-member group, the maximum number of accommodable members and designations thereof are indicated. Thus, according to characteristics of members belonging to respective groups, it is possible to carry out optimum formation of the groups, optimum destination assignment to the group, and optimum planning for each of the groups.

Still further, in accordance with another aspect of the present invention, information on any member contains a mobile capability, of the member (a speed of movement or a value equivalent thereto) and a working capability (a time to be taken for accomplishing a task or a value equivalent thereto). Thus, according to characteristics of respective members, optimum formation of the groups, optimum assignment to the groups, and optimum planning for each of the groups can be carried out.

Still further, in accordance with another aspect of the present invention, a cost function contains a coefficient inherent in each group and/or a threshold inherent therein. Thus, in a fashion in which a ratio of loads on respective groups is specified, optimum formation of the groups, optimum destination assignment to the groups, and optimum planning for each of the groups can be carried out.

Still further, in accordance with another aspect of the present invention, a value of a cost function (cost value) represents a value of distance (or a value which can be represented in terms of distance through conversion) and/or a value of time (or a value which can be represented in terms of time through conversion). Thus, in terms of time or distance, optimum formation of the groups, optimum destination assignment to the groups, and optimum planning for each of the groups can be carried out.

Still further, in accordance with another aspect of the present invention, at the time of new assignment of an unassigned destination and visiting plan re-formation therewith, group selection is made for the unassigned destination, tentative assignment of the unassigned destination, re-formation of a tentative visiting plan, and tentative cost calculation are performed for each group, the unassigned destination is formally assigned to a group having a minimum tentative cost, and the tentative visiting plan is adopted formally. Thus, new assignment of the unassigned destination can be accomplished promptly.

Still further, in accordance with another aspect of the present invention, in group selection, at least a group having a minimum cost at the current point of time is selected. Thus, new assignment of the unassigned destination can be accomplished promptly and optimally.

Still further, in accordance with another aspect of the present invention, in re-assignment of already assigned destinations and visiting plan reformation therewith, a plurality of groups are selected, the selected plural groups are divided into a group having a maximum cost (group A) and a set of the other groups, already assigned destinations are tentatively unassigned from the group A, tentative visiting plan re-formation and tentative cost (tentative cost A) calculation are performed for the group A, tentative assignment of the tentatively unassigned destinations, tentative visiting plan re-formation, and tentative cost calculation are performed for each group belonging to the set of the other groups, and if a minimum tentative cost (tentative cost B) and the tentative cost A are lower than an original cost of the group A, tentative conditions that have caused the tentative cost A and tentative cost B are adopted formally. Thus, re-assignment of the already assigned destinations can be carried out promptly.

Still further, in accordance with another aspect of the present invention, in selection of a plurality of groups, at least a group having a maximum cost at the current point of time and/or a group having a minimum cost at the current point of time are selected. Thus, re-assignment of the already assigned destinations can be carried out promptly and optimally.

Still further, in accordance with another aspect of the present invention, in variable-member group re-arrangement and visiting plan re-formation therewith, a variable-member group in which the number of members is smaller than the maximum number of accommodable members is selected, unassigned members are selected within a range that group constraints are satisfied, each of the members thus selected is tentatively assigned to the selected variable-member group, tentative visiting plan re-formation and tentative cost calculation are performed, and if a minimum tentative cost is lower than an original cost of the selected variable-member group, tentative conditions that have caused the minimum tentative cost are adopted formally. Thus, addition of the unassigned members to the variable-member group can be carried out promptly.

Still further, in accordance with another aspect of the present invention, in variable-member group election, among variable-member groups in which the number of members is smaller than the maximum number of accommodable members, a variable-member group having a maximum absolute value of difference between the number of members and the maximum number of accommodable members is selected. Thus, addition of the unassigned members to the variable-member group can be carried out promptly and optimally.

Still further, in accordance with another aspect of the present invention, in variable-member group rearrangement and visiting plan re-formation therewith, a variable-member group is selected, at least one of members of the selected variable-member group is unassigned, unassigned members are selected within a range that group constraints are satisfied, each of the members thus selected is tentatively assigned to the selected variable-member group, tentative visiting plan re-formation and tentative cost calculation are performed, and if a minimum tentative cost is lower than an original cost of the selected variable-member group, tentative conditions that have caused the minimum tentative cost is adopted formally. Thus, assigned members belonging to a variable-member group can be exchanged with unassigned members promptly.

Still further, in accordance with another aspect of the present invention, in variable-member group selection, a variable-member group having a maximum cost at the current point of time is selected. Thus, assigned members belonging to a variable-member group can be exchanged with unassigned members promptly and optimally.

Still further, in accordance with another aspect of the present invention, in variable-member group re-arrangement and visiting plan re-formation, a plurality of variable-member groups are selected, the selected plural variable-member groups are divided into a variable-member group having a maximum cost (variable-member group A) and a set of the other variable-member groups, tentative member exchange is made between each variable-member group belonging to the set of the other variable-member groups and the variable member group A within a range that group constraints are satisfied, tentative visiting plan re-formation and tentative cost calculation are performed for the set of the other variable-member groups, tentative visiting plan re-formation and tentative cost calculation are performed for the variable-member group A, a tentative cost of the set of the other variable-member groups is compared with a tentative cost of the variable-member group A to select a pair cost corresponding to a higher one, and if a minimum value of the pair cost is lower than an original cost of the variable-member group A (maximum cost), tentative conditions that have caused the minimum value of the pair cost are adopted formally. Thus, member exchange between the variable-member groups can be carried out promptly.

Still further, in accordance with another aspect of the present invention, in election of a plurality of variable-member groups, a variable-member group having a maximum cost at the current point of time is selected. Thus, member exchange between the variable-member groups can be carried out promptly and optimally.

Still further, in accordance with another aspect of the present invention, in selection or a plurality of variable-member groups, either one of a variable-member group having a maximum cost at the current point of time and a variable-member group having a minimum cost at the current point of time is selected. Thus, member exchange between the variable-member groups can be carried out promptly.

Still further, in accordance with another aspect of the present invention, there is provided a visiting plan generation system comprising: input means for receiving various kinds of necessary information for visiting plan generation; state memory means for memorizing a state taken at a predetermined point of time and an optimum state in preceding visiting plan conditions; new-assignment means for newly assigning an unassigned destination; re-assignment means for re-assigning an already assigned destination; group re-arrangement means for re-arranging groups; plan re-formation means for re-forming a visiting plan for each group; and cost calculation means for calculating a visiting plan cost for each group. In this system, optimum formation of the groups, optimum destination assignment to the groups, and optimum planning for each of the groups can be carried out efficiently.

Still further, in accordance with another aspect of the present invention, there is provided with a visiting plan generation system wherein the input means is so structured as to receive at least information on destinations, information on groups, and information on members. Thus, based on each of these information, optimum formation of the groups, optimum destination assignment to the groups, and optimum planning for each of the groups can be performed efficiently.

As mentioned above, the present invention provides a visiting plan generation method wherein, for a plurality of groups having invariable and/or variable members (persons or apparatuses) to visit a plurality of destinations on a task-sharing basis, it is possible to promptly accomplish optimum formation of variable-member groups, optimum destination assignment to the groups, and optimum planning for each of the groups. The present invention is therefore usable as an effective method in applications of generating such action plans as a transportation plan, process plan, and operation plan.

Accordingly, it is a general object of the present invention to provide a visiting plan generation method and system for promptly carrying out optimum formation of groups, optimum destination assignment to the groups, and optimum planning for each of the groups in an optimization problem concerning a visiting plan.

Another object of the present invention is to provide a visiting plan generation method and system for making an optimum solution for a visiting plan applicable to generation of such action plans as a transportation plan, process plan, and operation plan.

The above and other objects, features and advantages of the present invention will become more apparent from the following detailed description with reference to the accompanying drawings.

DETAILED DESCRIPTION OF THE PREFERRED EMBODIMENTS

The present invention will now be described in detail by way of example with reference to FIGS. 1 to 14.

Figure 1:
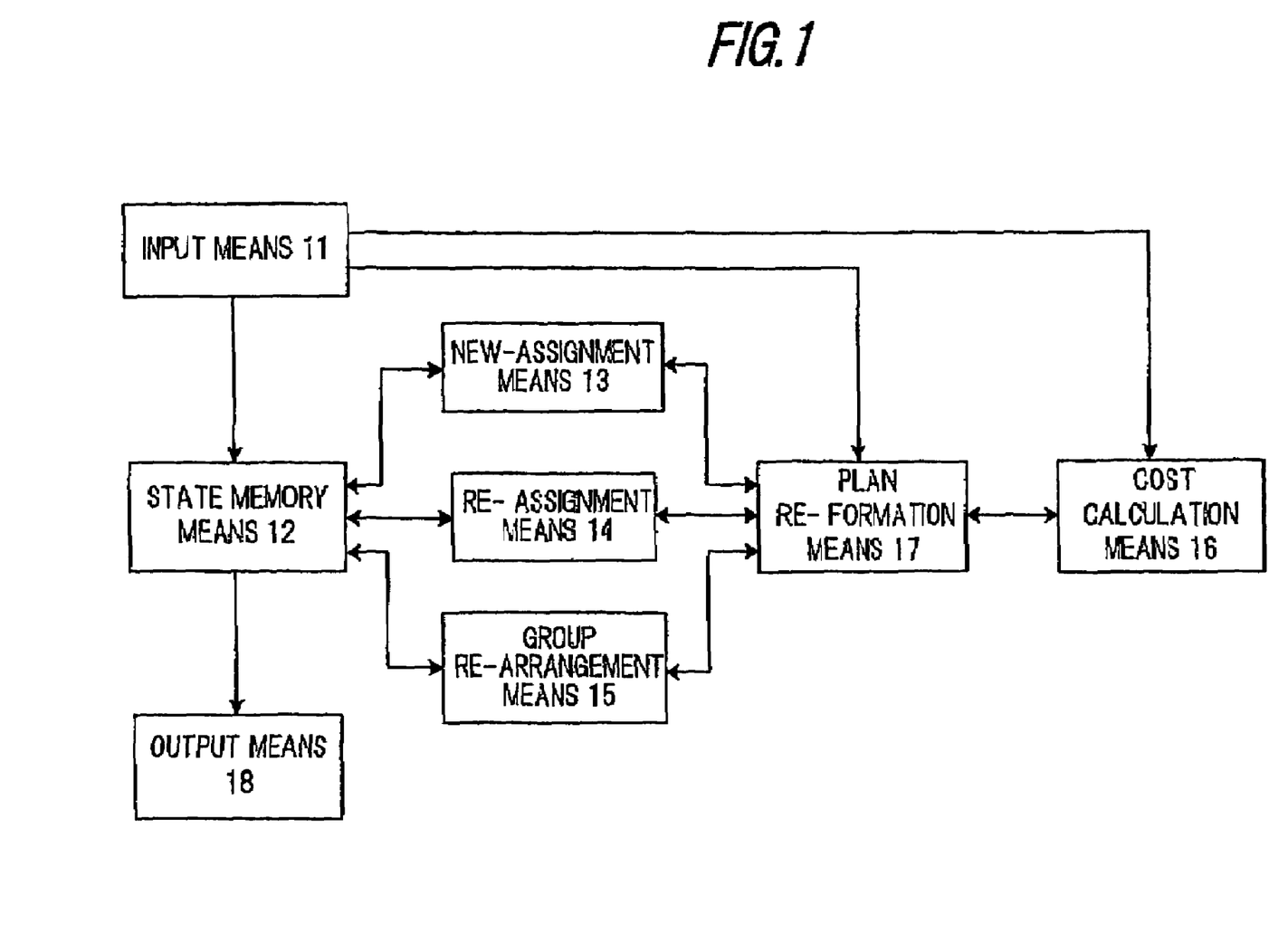
FIG. 1 is a block diagram of a system for implementing a visiting plan generation method in a preferred embodiment of the present invention.

Referring to FIG. 1, there is shown a block diagram of a visiting plan generation system for implementing a visiting plan generation method in a preferred embodiment of the present invention. In FIG. 1, reference numeral 11 indicates input means for receiving various kinds of information including at least information on destination, information on groups, and information on members, reference numeral 12 indicates state memory means for memorizing a state taken at a predetermined point of time (group formation, group visiting plan, destination assignment, belongingness of members) and an optimum state in preceding visiting plan conditions, reference numeral 13 indicates new-assignment means for newly assigning an unassigned destination, reference numeral 14 indicates re-assignment means for re-assigning an already assigned destination, reference numeral 15 indicates group re-arrangement means for re-arranging groups, and reference numeral 16 indicates plan re-formation means for re-forming a visiting plan for each group, reference numeral 17 indicates cost calculation means for calculating a visiting plan cost for each group, and reference numeral 18 indicates output means for delivering output data. The input means 11 reads in the information on destinations, information, on groups, and information on members, and retains these read-in information.

Figure 2:
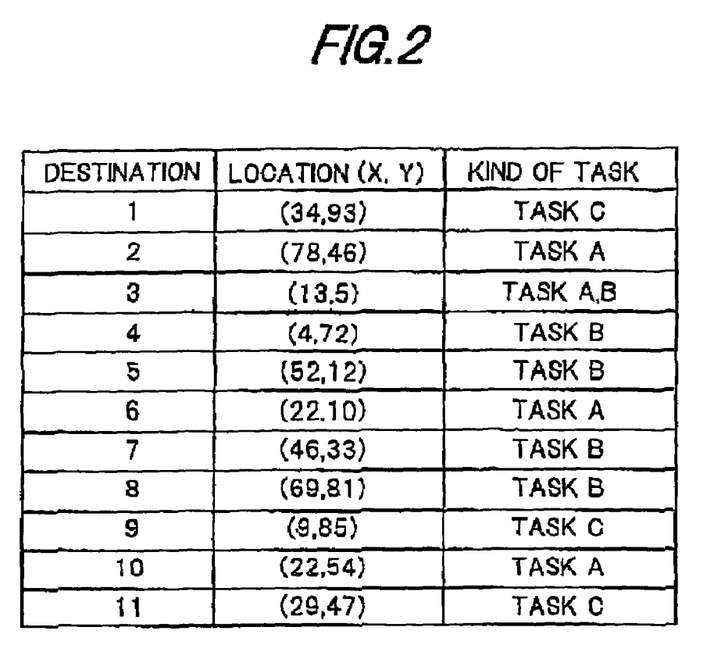
FIG. 2 is a diagram showing information on destinations in the preferred embodiment of the present invention.

Referring to FIG. 2, there is shown an example of information on destinations. For instance, destination 3 is at location "X-13, Y-5", and a member visiting destination 3 is to accomplish tasks A and B.

Figure 3:
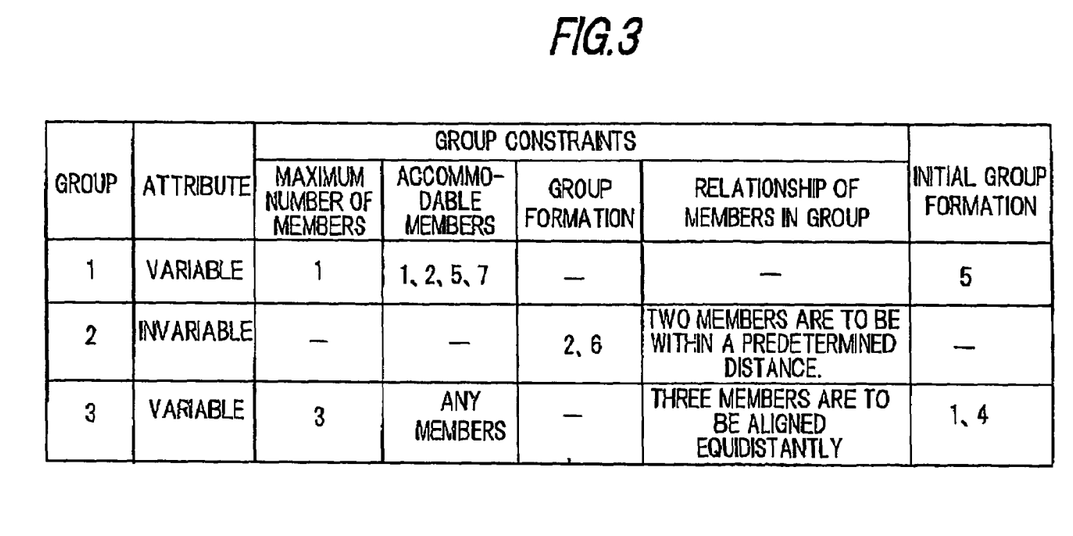
FIG. 3 is a diagram showing information on groups in the preferred embodiment of the present invention.

Referring to FIG. 3, there is shown an example of information on groups. For instance, group 2 is a invariable-member group consisting of members 2 and 6, and a relationship between members 2 and 6 belonging to this group indicates a condition that two members are to be positioned within a predetermined distance range (e.g., a constraint in a situation where two members go on a visit while communicating with each other using transceivers, or two members are connected by a cord). Group 3 is a variable-member groups, the maximum number of members in this group is 3, any member may be made to belong to this group, a relationship of members indicates a condition that three members are to be aligned equidistantly, and members 1 and 4 are provided in initial group formation.

Figure 4:
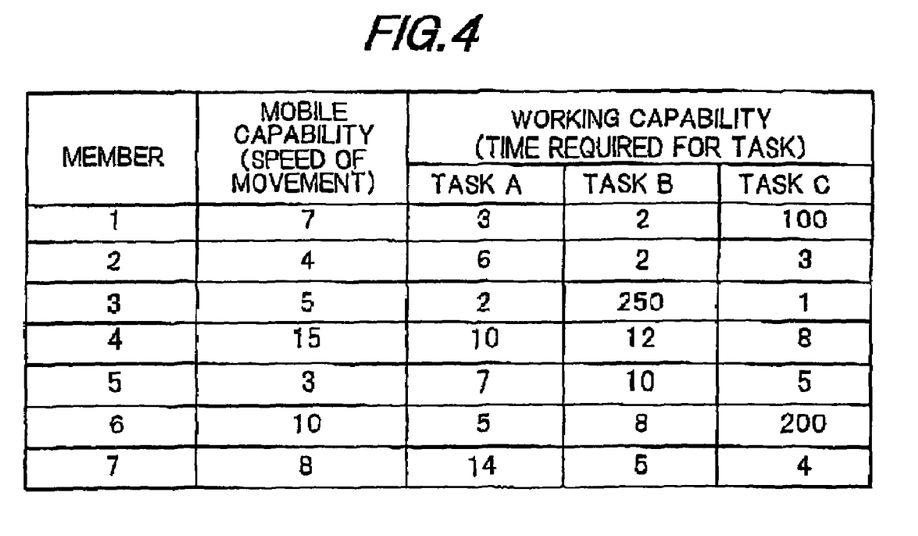
FIG. 4 is a diagram showing information on members in the preferred embodiment of the present invention.

Referring to FIG. 4, there is shown an example of information on members. For instance, member 1 provides a mobile capability (speed of movement) of 7, a working capability (time requirement) of 3 for task A, a time requirement of 2 for task B, and a time requirement of 100 for task C (i.e., member 1 is not good at task C).

Then, the state memory means 12 is described below. Information on destinations, information on groups, and information on members retained in the input means 11 are fed to the state memory means 12, in which a state (including group formation, group visiting plan, destination assignment, and belongingness of members) is then initialized. Thereafter, the state memory means 12 updates and memorizes a state according to a change indicated by the new-assignment means 13, the re-assignment means 14, and the group re-arrangement means 15, which will be explained more fully later.

Figure 5:
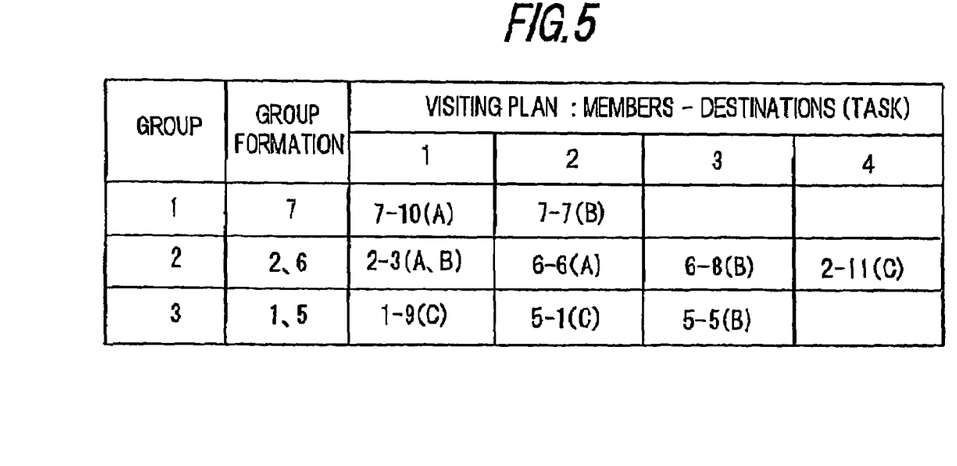
FIG. 5 is a diagram showing formation of groups and a visiting plan therefor in the preferred embodiment of the present invention.

Referring to FIG. 5, there is shown an example of formation of groups and a visiting plan therefor. For instance, variable-member group 3 includes members 1 and 5. Member 1 belonging to this group is to visit destination 9 for performing task C, member 5 is to visit destination 1 for performing task C, and member 5 is to visit destination 5 for performing task B.

Figure 6:
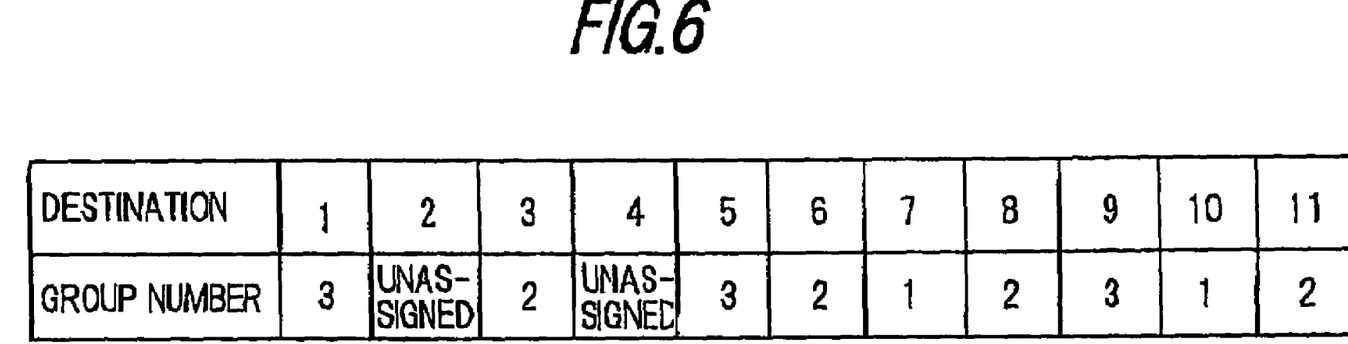
FIG. 6 is a diagram showing destination assignment to groups in the preferred embodiment of the present invention.

Referring to FIG. 6, there is shown an example of destination assignment to groups. For instance, destination 1 is assigned to group 3, and destination 2 is an unassigned destination.

Figure 7:
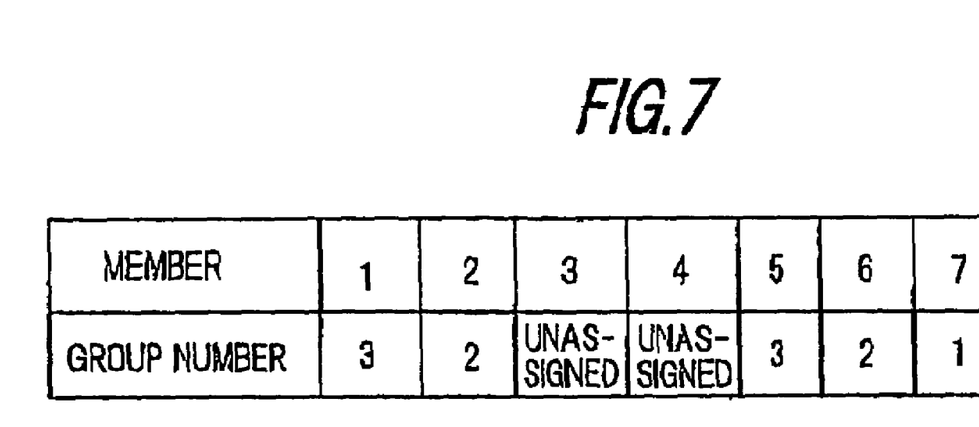
FIG. 7 is a diagram showing belongingness of members to groups in the preferred embodiment of the present invention.

Referring to FIG. 7, there is shown an example of belongingness of members to groups. For instance, member 1 belongs to group 3, and member 3 is not yet made to belong to any group. The state memory means 12 memorizes these conditions. After the number of unassigned destinations becomes zero, the state memory means 12 also memorizes a minimum of a state cost F (X) attained so far. (State cost F (X): A cost in state X; to be distinguished from Fi (Xi) representing a cost of visiting plan Xi for group "i" in state X, which is calculated by the cost calculation means 16 to be explained later) That is to say, the visiting plan generation method of the present invention has a feature that a minimum of the state cost F (X) is determined.

Further, the visiting plan generation method of the present invention is characterized in that a maximum cost value in groups is minimized and in that cost values in groups are equalized. For instance, the state cost F (X) is subjected to minimization as expressed below:

$$F(X)=\alpha \times MAXi[Fi(Xi)]+\beta \times S(X) \qquad (Eq. 1)$$

In this expression, MAXi [Fi (Xi)] is a function that returns a maximum value with respect to "i" of Fi (Xi), i.e., a function that returns a smaller value as a maximum cost value in groups in state X is decreased. S (X) is a function that evaluates variation with respect to "i" of Fi (Xi) in state X, i.e., a function that returns a smaller value as cost values in groups in state X are equalized. As a concrete example of S (X), a standard deviation or variance function for "i" of Fi (Xi) in state X is applicable. As to coefficients α and β, conditions "α≧0" and "BATA≧0" must be satisfied on the premise that at least one of them has a value.

More specifically, the state cost F (X) defined by Equation 1 takes a smaller value as a maximum cost value in groups in state X is decreased and/or as cost values in groups in state X are equalized. Through minimization of the state cost F (X), it is possible to carry out minimization of a maximum cost value in groups and/or equalization of cost values in groups.

Further, for realizing minimization of an average cost value in groups and/or equalization of cost values in groups, the state cost F (X) may be expressed a shown below, for example:

$$F(X)=\alpha \times AVEi[Fi(Xi)]+\beta \times S(x) \qquad (Eq. 2)$$

In this expression, AVEi [Fi (Xi)] is a function for returning an average value with respect to "i" of Fi (Xi), i.e., a function that returns a smaller value as an average cost value in groups in state X is decreased.

Figure 8:
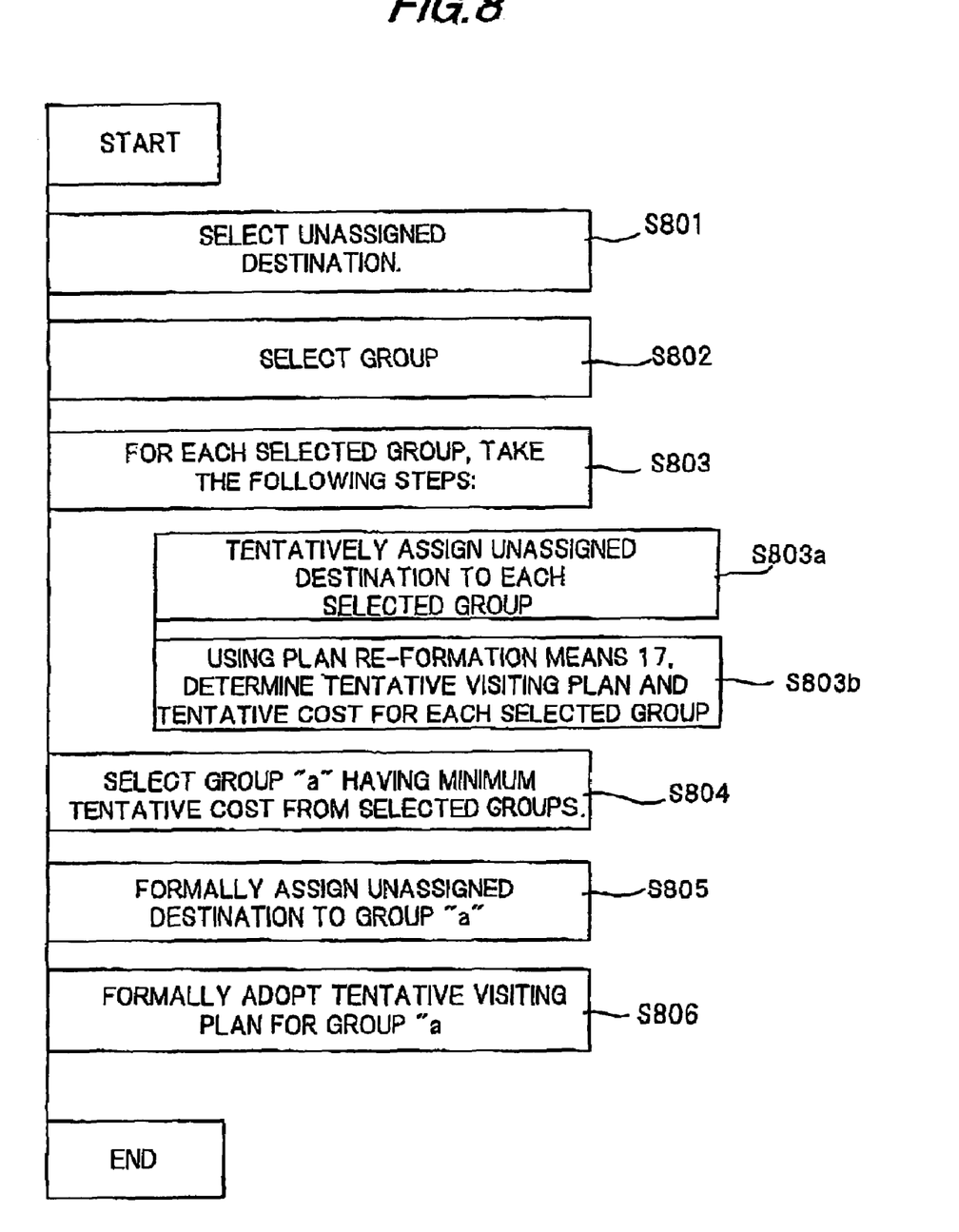
FIG. 8 is a flowchart for explanation of a new assignment processing operation by new-assignment means in the preferred embodiment of the present invention.

Then, the new-assignment means 13 is described below. State X memorized in the sate memory means 12 is fed to the new-assignment means 13. Using the plan re-formation means 17 (to be explained later), the new-assignment means 13 newly assigns an unassigned destination to a group. FIG. 8 shows an example of a flowchart or internal processing to be carried out in the new-assignment means 13. As shown in FIG. 8, in step S801, reference is made to state X (FIG. 6) for selecting one or plural unassigned destinations. Then, in step S802, except groups having no members, one or plural groups including a group having a minimum cost at the current point of time are selected. Then, for each selected group (step S803), the following steps are taken: Any selected unassigned destination is tentatively assigned to each selected group (step S803a), and using the plan re-formation means 17, a tentative visiting plan and a tentative cost are determined for each selected group (step S803b). Then, in step S804, a group "a" having a minimum tentative cost is selected from the selected groups. Then, in step S805, an unassigned destination is formally assigned to the group "a". Finally, the tentative visiting plan for the group "a" is adopted as a formal visiting plan. Through the steps mentioned above, a proper group can be determined for assignment of each unassigned destination.

Figure 9:
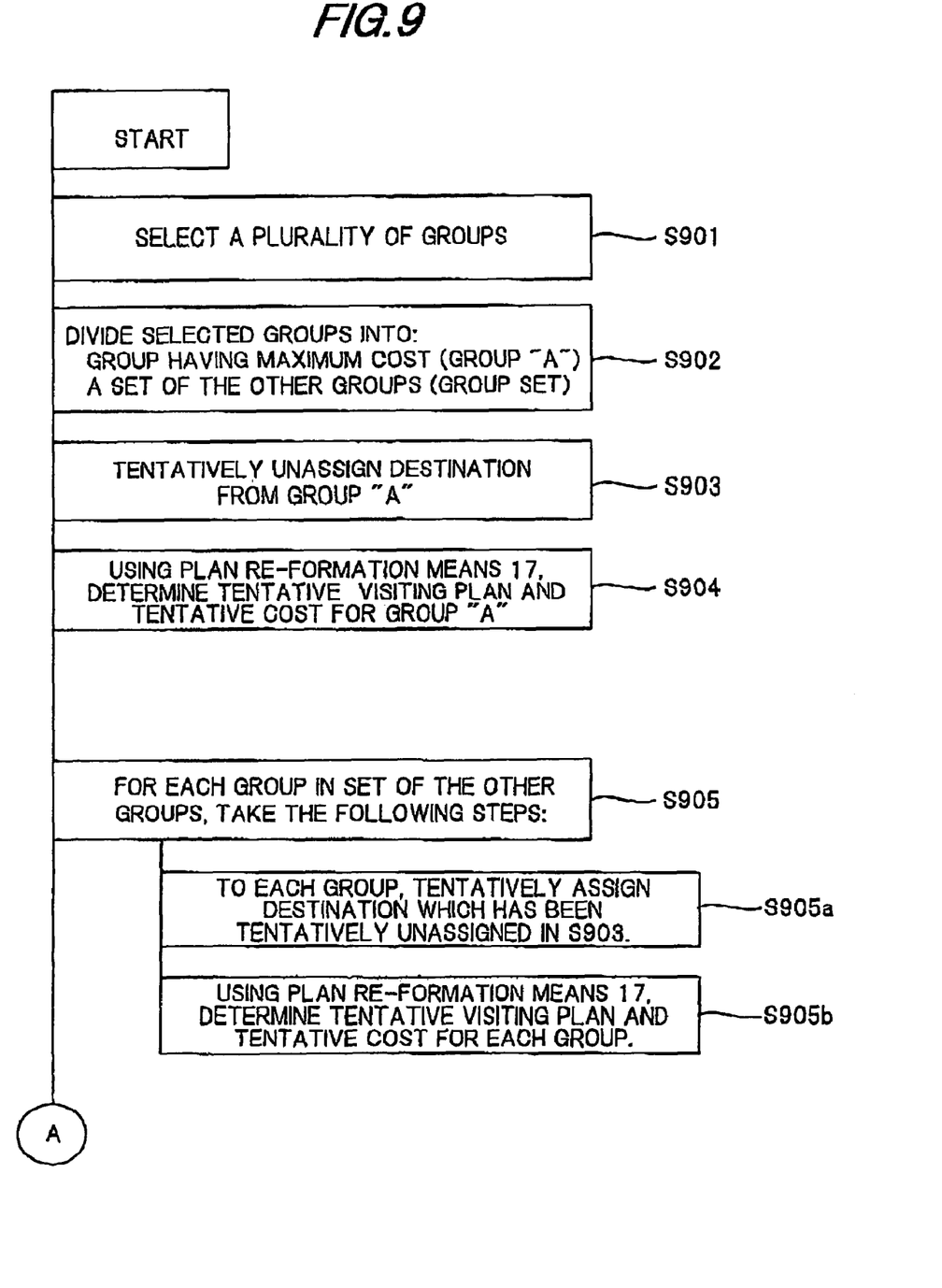
FIG. 9 is a flow chart for explaining the first half of a re-assignment processing operation by re-assignment means in the preferred embodiment of the present invention.
Figure 10:
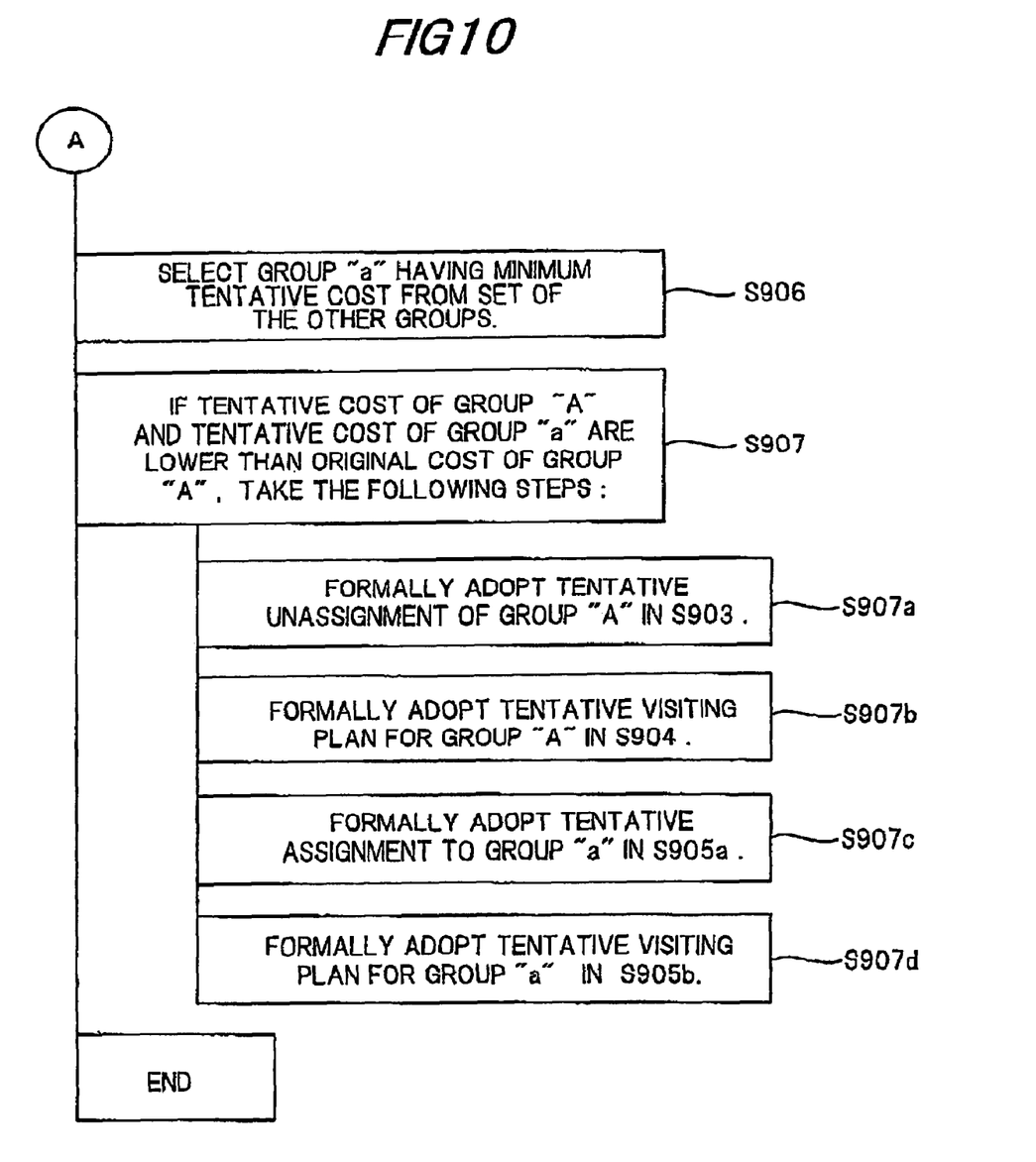
FIG. 10 is a flowchart for explanation of the second half of the re-assignment processing operation continued from FIG. 9.

The re-assignment means 14 is then described below. State X memorized in the sate memory means 12 is fed to the re-assignment means 14. Using the plan re-formation means 17, the re-assignment means 14 re-assigns an already assigned destination to a group. FIG. 9 presents an example of a flowchart showing the first half of re-assignment processing to be carried out by the re-assignment means 14, and FIG. 10 presents an example of a flowchart showing the second half of re-assignment processing to be carried out by the re-assignment means 14. Referring to these figures, in step S901, except groups having no members, a plurality of groups including a group having a maximum cost at the current point of time and/or a group having a minimum cost at the current point of time are selected. Then, in step S902, the selected groups are divided into a group having a maximum cost (group "A") and a set of the other groups (group set). Then, in step S903, a destination is tentatively unassigned from the group "A". In step S904, using the plan re-formation means 17, a tentative visiting plan and a tentative cost are determined for the group "A". Then, for each group in the set of the other groups (S905), the following steps are taken: The destination which has been tentatively unassigned in step S903 is tentatively assigned to each group therein (S905a), and using the plan re-formation means 17, a tentative visiting plan and a tentative cost are determined for each group therein (S905b). Then, in step S906, group "a" having a minimum tentative cost is selected from the set of the other groups. Finally, if both the tentative cost of group "A" and the tentative cost of group "a" are lower than an original cost of group "A" (a cost indicated before tentative unassignment) (S907), the following steps are taken: The tentative unassignment of group "A" in step S903 is formally adopted (S907a), the tentative visiting plan for group "A" in step S904 is formally adopted (S907b), the tentative assignment to group "a" in step S905a is formally adopted (S907c), and the tentative visiting plan for group "a" in step S905b is formally adopted. Through the steps mentioned above, an already assigned destination can be re-assigned to a proper group.

Figure 13:
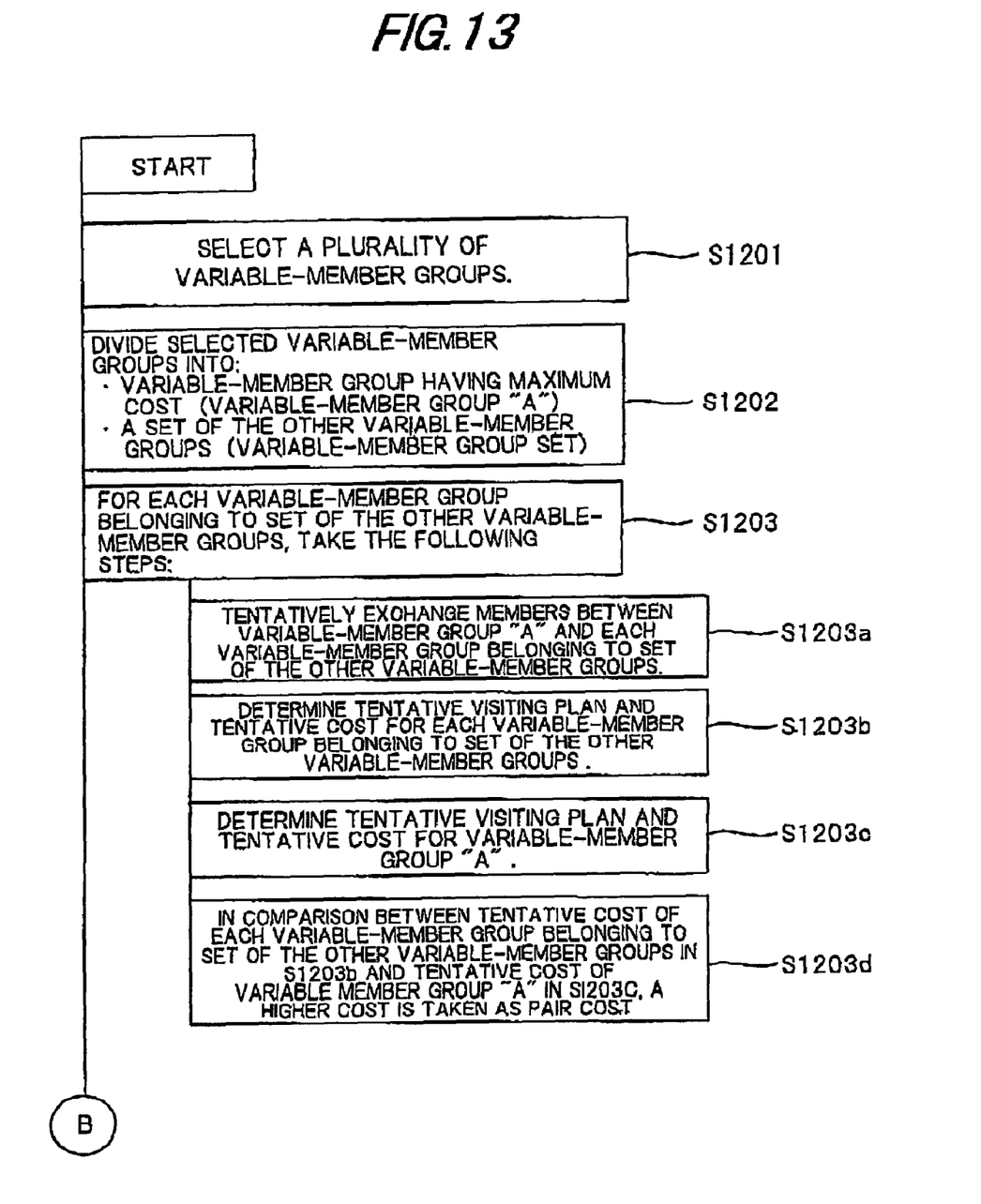
FIG. 13 is a flowchart for explanation of the first half of another group re-arrangement processing operation by the group re-arrangement means in the preferred embodiment of the present invention.
Figure 14:
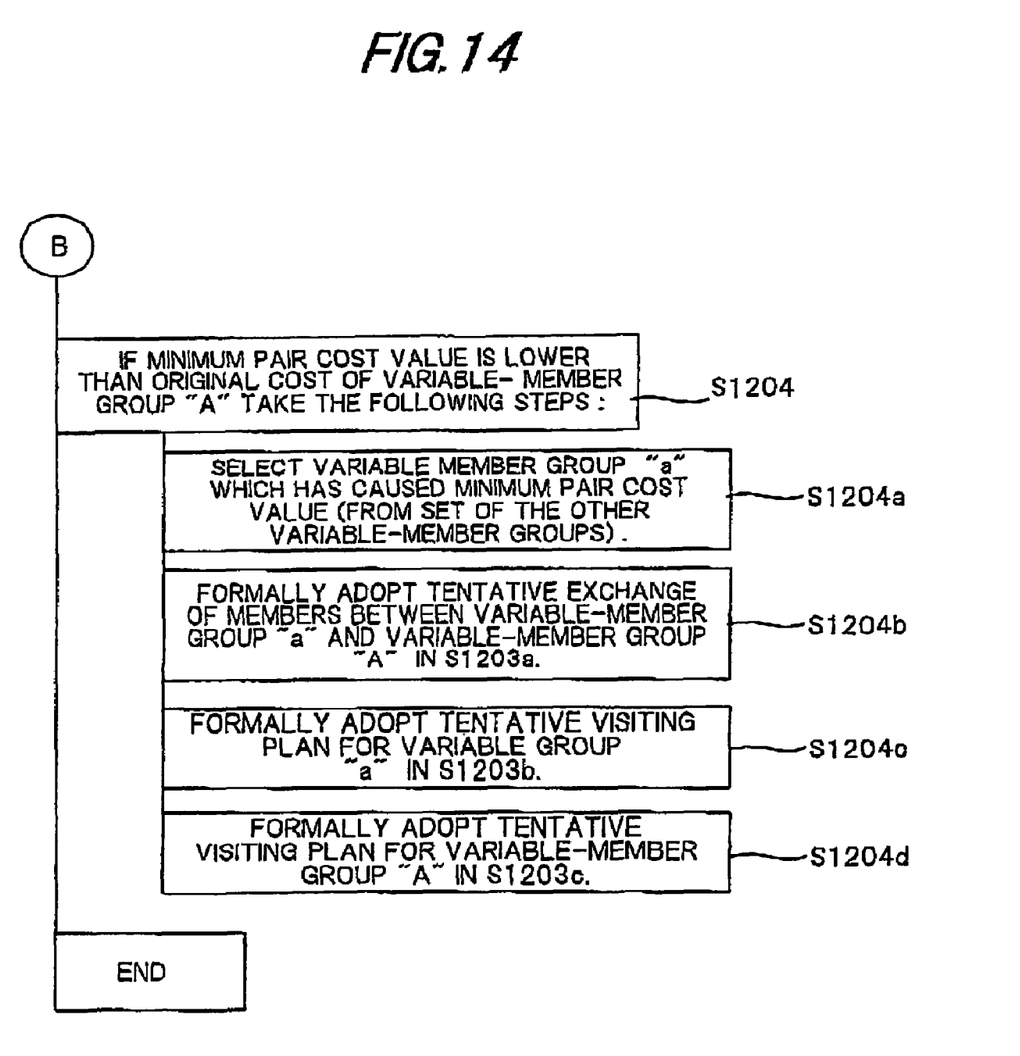
FIG. 14 is a flowchart for explanation of the second half of the group re-arrangement processing operation continued from FIG. 13.

The group re-arrangement means 15 is then described below. State X memorized in the state memory means 12 is fed to the group re-arrangement means 15. Using the plan re-formation means 17, the group re-arrangement means 15 re-arranges groups. FIGS. 11, 12, 13 and 14 present examples of flowcharts showing group re-arrangement processing to be carried out by the group re-arrangement means 15. The following explains the group re-arrangement processing with reference to these figures. Note that FIGS. 13 and 14 are flowcharts showing the first half and the second half of a group rearrangement processing operation, respectively.

Figure 11:
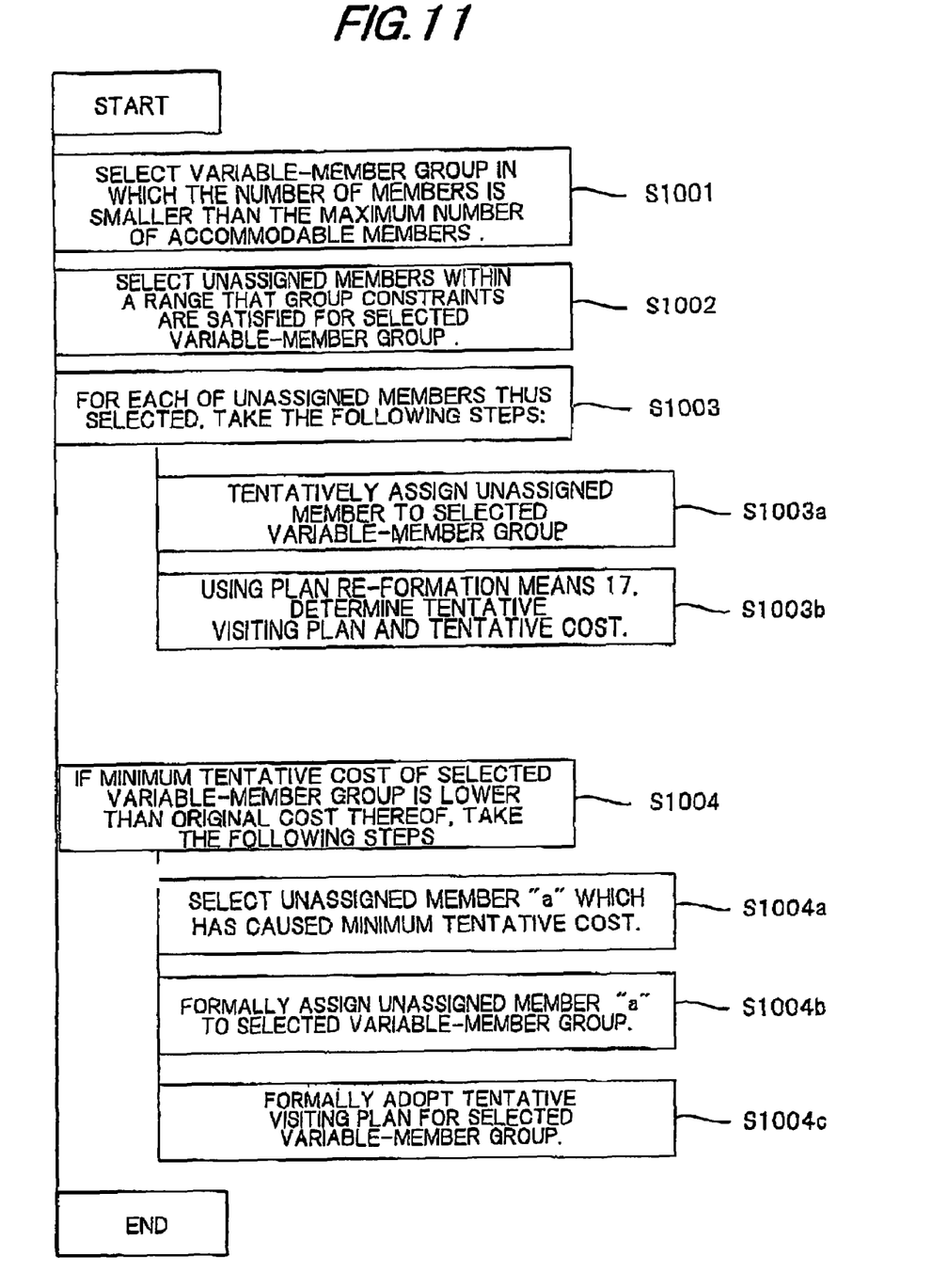
FIG. 11 is a flowchart for explanation of a group rearrangement processing operation by group re-arrangement means in the preferred embodiment of the present invention.

Referring to FIG. 11, in step S1001, a variable-member group in which the number of members is smaller than the maximum number of accommodable members (FIG. 3) is selected. In this step, it is alternatively preferable to select a variable-member group having a maximum absolute value of difference between the number of members and the maximum number of accommodable members. Then, in step S1002, unassigned members are selected within a range that group constraints (FIG. 3) are satisfied. Then, for each of the unassigned members thus selected (S1003), the following steps are taken: Each selected member is made to tentatively belong to the selected variable-member group (S1003a), and using the plan re-formation means 17, a tentative visiting plan and a tentative cost are determined (S1003b). Finally, if execution of step S1003 results in a condition that a minimum tentative cost of the selected variable-member group is lower than an original cost thereof (S1004), the following steps are taken: An unassigned member "a" which has caused the minimum tentative cost is selected (S1004a), the unassigned member "a" is made to formally belong to the selected variable-member group (S1004b), and the tentative visiting plan is formally adopted for the selected variable-member group (S1004c). Thus, an unassigned member can be added to a variable-member group in which the number of members is smaller than the maximum number of accommodable members (FIG. 3).

Figure 12:
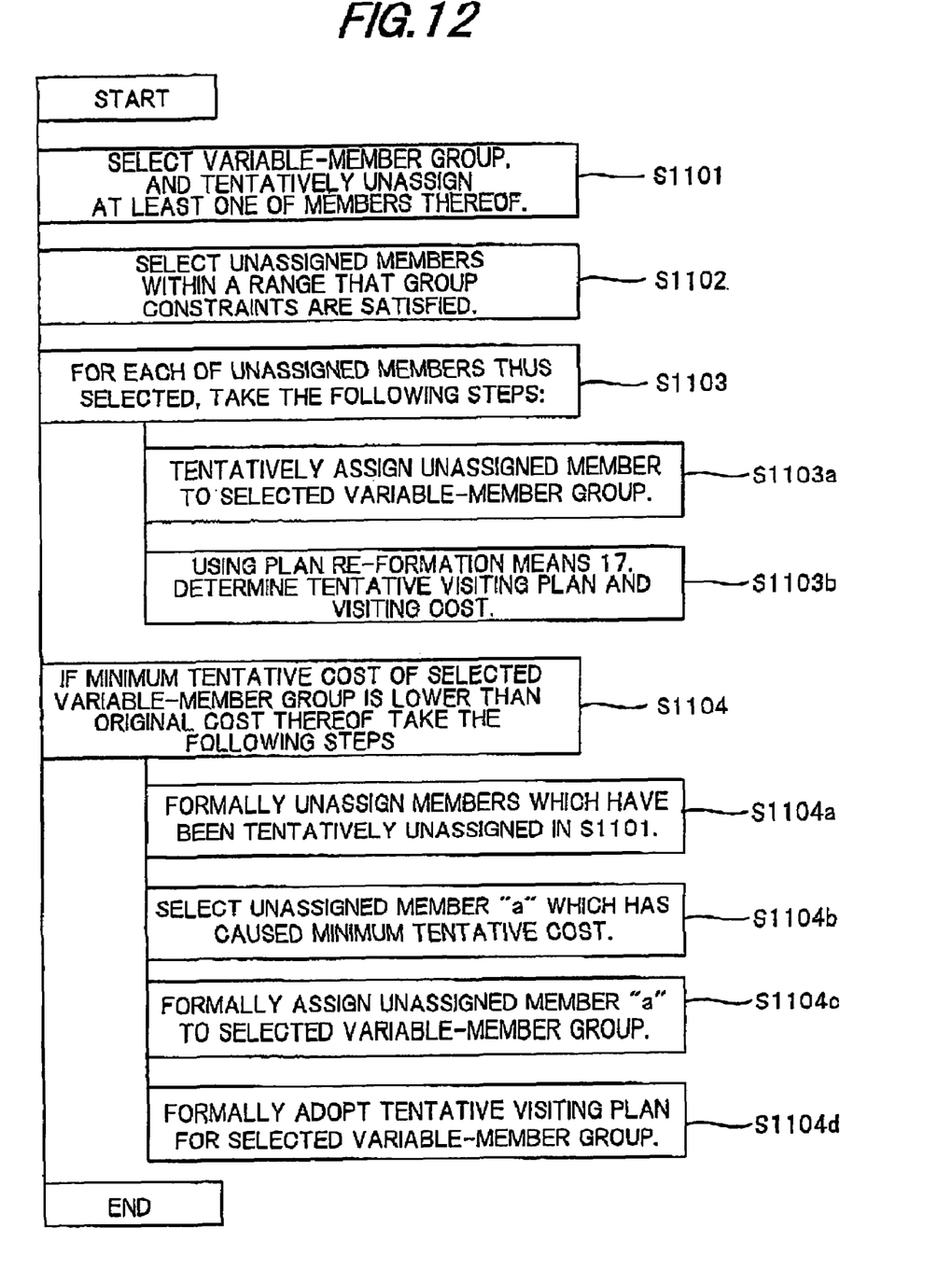
FIG. 12 is a flowchart for explanation of another group re-arrangement processing operation by the group re-arrangement means in the preferred embodiment of the present invention.

Referring to FIG. 12, in step S1101, a variable-member group is selected and its members (at least one of members) are unassigned. In variable-group selection, it is alternatively preferable to select a variable-member group having a maximum cost at the current point of time. Then, in step S1102, unassigned members are selected within a range that group constraints (FIG. 3) are satisfied. Then, for each of the unassigned members thus selected (S1103), the following steps are taken: Each selected member is made to tentatively belong to the selected variable-member group (S1103a), and using the plan re-formation means 17, a tentative visiting plan and a tentative cost are determined (S1103b). Finally, if execution or step 61103 results in a condition that a minimum tentative cost of the selected variable-member group is lower than an original cost thereof (S1104), the following steps are taken: The members tentatively unassigned in step S1101 are formally unassigned from the selected variable-member group (S1104a), an unassigned member "a" which has caused the minimum tentative cost is selected (S1104b), the unassigned member "a" is made to formally belong to the selected variable-member group (S1104c) and the tentative visiting plan is formally adopted for the selected variable-member group (S1104d). Thus, members can be exchanged even for a variable-member group in which the number of members is equal to the maximum number of accommodable members (FIG. 3).

Referring to FIGS. 13 and 14, in step S1201, a plurality of variable-member groups are selected. In variable-member group selection, at least one variable-member group having a maximum cost at the current point of time may be selected from all the variable-member groups. In an alternative fashion, a variable-member group having a maximum cost at the current point of time and a variable-member group having a minimum cost at the current point of time may also be selected from all the variable-member groups. Then, in step 1202, the selected variable-member group are divided into a variable-member group having a maximum cost (variable-member group "A") and a set of the other variable-member groups (variable-member group set). Then, for each variable-member group belonging to the set of the other variable-member groups (S1203), the following steps are taken: Within a range that group constraints are satisfied, members are tentatively exchanged between the variable-member group "A" and each variable-member group belonging to the set of the other variable-member groups (S1203a). Using the plan re-formation means 17, a tentative visiting plan and a tentative cost are determined for each variable-member group belonging to the set of the other variable-member groups (S1203b), and a tentative visiting plan and a tentative cost are determined for the variable-member group "A" (S1203C). In comparison between the tentative cost of the variable-member group "A" and the tentative cost of each variable-member group belonging to the set of the other variable-member groups, a higher cost is taken as a pair cost (S1203d). Finally, if a minimum pair cost value is lower than an original cost (maximum cost) of the variable-member group "A" (S1204), the following steps are taken; A variable-member group "a" which has caused the minimum pair cost value is selected (S1204a), the tentative exchange of the members between the variable-member group "a" and the variable-member group "A" in step S1203a is formally adopted (S1204b), the tentative visiting plan for the variable-member group "a" in step S1203b is formally adopted (S1204c), and the tentative visiting plan for the variable-member group "A" in step S1203c is formally adopted (S1204d). Thus, proper exchange of members between variable-member groups can be carried out properly.

The cost calculation means 16 is then described below. The cost calculation means 16 is supplied with a visiting plan Xi for group "i" in state X, and information on destinations and information on members retained in the input means 11. In response to these information, the cost calculation means 16 returns a cost Fi (Xi) for the visiting plan Xi. For example, in the present embodiment, the color Fi (Xi) is designed as expressed below:

$$Fi(Xi)=Ai \times (M(Xi)+W(Xi))+Bi \qquad (\text{Eq. 3})$$

In this expression, M (Xi) indicates a total time required for movement in the visiting plan xi, and W (Xi) indicates a total time required for accomplishing tasks in the visiting plan Xi. Hence, (M (Xi)+W (xi)) represents a total time required for carrying out the visiting plan Xi, i.e., a load to be imposed on group "i". Ai is a coefficient inherent in group "i", and Bi is a threshold inherent therein. Using these values, a load ratio among groups can be adjusted. Calculation of M (Xi) is rather easy in a situation where the number of members in a group is "1" (distance between two destinations/movement speed of a member going on a visit). In a situation where the number of members in a group is "2" or more, however, it is required to some adjustment due to constraints on the members (it is required to predetermine how a member is to move while another member is on the way to a certain destination).

The plan re-formation means 17 is then described below. The plan re-formation means 17 is used by the new-assignment means 13, the re-assignment means 14, or the group re-arrangement means 15. Supplied with information on members belonging to group "i", information on assigned destinations for group "i", information on destinations retained by the input means 11, and information on members retained by the input means 11, the plan re-formation means 17 generates a visiting plan Xi using the cost calculation means 16. This function can be implemented through the use of an optimization technique such as a greedy method, hill-climbing method, neural network model method, simulated annealing method or genetic algorithm method, a heuristic technique, or any combination thereof.

The output means 18 is then described below. An optimum state memorized in the state memory means 12 is output to an external circuit through the output means 18.

As set forth hereinabove, it is to be understood that the present invention is not limited in its application to visiting plan generation on a group-by-group basis as in the Traveling Salesman Problem. The present invention is also applicable to generation of a variety of action plans, for example, in an electronic part assembly process in which IC devices are mounted onto printed circuit boards (each of plural arms having a device (each of plural visitors) moves to (visits) a predetermined position on a printed circuit board for mounting the device thereonto), or in package distribution operation in transportation.

The invention may be embodied in other specific forms without departing from the spirit or essential characteristics thereof. The present embodiment is therefore to be considered in all respects as illustrative and not restrictive, the scope of the invention bring indicated by the appended claims rather than by the foregoing description and all changes which come within the meaning and range of equivalency of the claims are therefore intended to be embraced therein.

What is claimed is:

1. A visiting plan generation system, comprising:
   a plan generating means for generating a visiting plan of a group at a predetermined point of time, based on information including locations of destinations, and conditions of tasks to be performed as information on said destinations, and information of said group constructed by a plurality of members including a mobile capacity (speed of movement) and a working capability defined by time required for the tasks of said members necessary for visiting plan generation;
   a destination assignment means for assigning a destination to the group and the members of the group when the plan generating means generates the visiting plan;
   a state memory means for memorizing a state X showing said visiting plan generated, the members of said each group and information on destination assignment to each group, and an optimum state in preceding visiting plan conditions;
   a state re-arrangement means connected with said state memory means for re-arranging the visiting plan to an optimum states by re-arranging the destination to the group and the members of the group based on the state X memorized in said state memory means;
   a cost calculation means for calculating total time spent in moving and total time spent in working as the visiting plan cost $Fi(Xi)$ of each group, based on information including locations of destinations, and conditions of tasks to be performed as information on said destinations, and information of said group constructed by a plurality of members including a mobile capacity (speed of movement) and a working capability defined by time required for the tasks of said members necessary for visiting plan generation;
   a plan re-formation means for re-forming a visiting plan $Xi$ for each group based on information including locations of destinations, and conditions of tasks to be performed, information of said group constructed by a plurality of members including a mobile capacity (speed of movement) and a working capability defined by time required for the tasks of said members, and information of visiting plan cost $Fi(Xi)$ of the group, and sending the re-formed visiting plan data to said state re-arrangement means;
   wherein said state re-arrangement means re-arranges members of the group and visiting plan thereof to an optimum state, using the visiting plan $Xi$ of the group I under the state X sent from the plan re-formation means and the visiting plan cost $Fi(Xi)$ thereof, and sending the re-arranged visiting plan data to the state memory means as a visiting plan of the group I to an optimum state.

2. A visiting plan generation system as claimed in claim 1, wherein the state re-arrangement means comprises:
   new-assignment means for newly assigning an unassigned destination to a group based on a state X memorized in the state memory means;
   re-assignment means for re-assigning an already assigned destination based on a state X memorized in the state memory means;
   group re-arrangement means for re-arranging groups based on a state X memorized in the state memory means.

3. A visiting plan generation system as claimed in claim 1, wherein the information on a group contains the members constructing a group and constraints between the members of the group.

4. A visiting plan generation system as claimed in claim 3, wherein the group constraints contains a maximum number of the members which can belong to the group.

5. A visiting plan generation system as claimed in claim 1, wherein the information on a group contains information that said group is an invariable-member group in which the members of the group cannot be re-arranged, or said group is a variable-member group in which the members of the group can be re-arranged.

6. A visiting plan generation system as claimed in claim 1, wherein the state re-arrangement means re-arranges members of the group and visiting plan thereof to an optimum state, in which a state cost function $F(X)$ giving maximum value of the cost among the groups is minimized by using the visiting plan $Xi$ of the group i under the state X and the visiting plan cost $Fi(Xi)$ thereof.

7. A visiting plan generation system as claimed in claim 1, wherein the state re-arrangement means re-arranges members of the group and visiting plan thereof to an optimum state, in which a state cost function $F(X)$ giving average value of the cost among the groups is minimized by using the visiting plan $Xi$ of the group i under the state X and the visiting plan cost $Fi(Xi)$ thereof.

* * * * *